United States Patent [19]
Kunugi et al.

[11] Patent Number: 5,186,241
[45] Date of Patent: Feb. 16, 1993

[54] CHEMICAL HEAT PUMP

[75] Inventors: Yoshifumi Kunugi, Ibaraki; Michio Yanadori, Ryugasaki; Toshihiko Fukushima, Tsuchiura; Tomihisa Ohuchi, Tsukuba, all of Japan

[73] Assignee: Hitachi, Ltd., Tokyo, Japan

[21] Appl. No.: 428,936

[22] Filed: Oct. 30, 1989

[30] Foreign Application Priority Data

Nov. 1, 1988 [JP] Japan .................. 63-274563

[51] Int. Cl.⁵ .......................... F25B 17/00
[52] U.S. Cl. .................. 165/104.12; 62/112; 62/478; 62/494
[58] Field of Search .......... 165/104.12; 62/478, 62/112, 494

[56] References Cited

U.S. PATENT DOCUMENTS

| | | | |
|---|---|---|---|
| 1,085,624 | 2/1914 | McKee | 62/494 |
| 4,638,646 | 1/1987 | Koseki et al. | 62/478 |
| 4,754,805 | 7/1988 | Rothmeyer | 62/112 |
| 4,823,864 | 4/1989 | Rockenfeller | 165/104.12 |

FOREIGN PATENT DOCUMENTS 1168421  6/1984  Canada ............ 165/104.12

*Primary Examiner*—Albert W. Davis, Jr.
*Attorney, Agent, or Firm*—Antonelli, Terry, Stout & Kraus

[57] ABSTRACT

The regeneration temperature of a chemical heat pump of closed system utilizing reversible reaction between calcium oxide and water is lowered by using an aqueous solution of a salt in an absorber-condenser provided separately from a reactor filled with calcium hydroxide.

4 Claims, 4 Drawing Sheets

CHEMICAL HEAT PUMP

BACKGROUND OF THE INVENTION

1) Field of the Invention

This invention relates to a chemical heat pump and more particularly to a chemical heat pump for working at any desired working temperature, which is suitable for process heating, generation of steam and hot water, room heating, hot water supply, etc. and can be used for utilizing midnight electric power, waste heat, etc. including the so called cogeneration.

2) Description of the Prior Art

A chemical heat pump of closed $CaO/Ca(OH)_2$ system utilizing reversible reactions between the reaction of calcium oxide (CaO) with water to form calcium hydroxide $[Ca(OH)_2]$ and the reaction to dehydrate calcium hydroxide to calcium oxide and water is disclosed, for example, in Japanese Patent Application Kokai (Laid-open) No. 61-180891.

That is, in a closed system where an evaporator-condenser is in connection with a reactor, that is, a regenerator-heat releaser, CaO is filled in the reactor, and the evaporator-condenser and the reactor each have a heat transfer tube at the inside. When a cooling medium is passed through the heat transfer tube of the evaporator-condenser and a regenerating heating medium is passed through the heat transfer tube of the reactor, the pressure in the evaporator-condenser reaches the water vapor pressure at the cooling medium temperature, that is, vacuum, and $Ca(OH)_2$ in the reactor is heated up to the regeneration temperature in vacuum to regenerate $Ca(OH)_2$ to CaO. The water vapor generated in the reactor is condensed to water in the evaporator-condensor.

When the regenerating heating medium is passed through the heat transfer tube in the evaporator-condenser after the regeneration, water is evaporated and the pressure of the evaporator-condenser is elevated to the water vapor pressure at the temperature of the regenerating heating medium and the resulting water vapor reacts with CaO in the reactor and the regenerating medium at an elevated temperature can be obtained from the heat transfer tube of the reactor.

In the above-mentioned prior art, the working temperature of a heat pump depends upon a working pressure, that is, water vapor pressures at the regeneration temperature and the cooling temperature, and no consideration is given to the fact that the working temperature of a heat pump cannot be changed.

SUMMARY OF THE INVENTION

An object of the present invention is to solve the problem of the prior art and to provide a chemical heat pump capable of changing the working pressure, thereby changing the working temperature of the heat pump, as desired, and particularly making the regeneration temperature lower than the regeneration temperature of the prior art, thereby considerably extending the application range of the heat pump.

The aforementioned object of the present invention can be obtained by a chemical heat pump of closed system, utilizing the reversible reaction between the reaction of calcium oxide with water to form calcium hydroxide and the reaction to dehydrate calcium hydroxide to calcium oxide and water, where an aqueous solution of a salt is contained in an evaporator-condenser provided separately from the reactor filled with calcium oxide or calcium hydroxide.

More particularly, the most typical structure of the present chemical heat pump comprises a regenerator heat releaser filled with a chemical heat-storing material and provided with a heat transfer tube, through which a heating medium is passed, at its inside, an absorber-evaporator containing an aqueous solution of a salt, an acid, an alkali or an organic compound and provided with a heat transfer tube for cooling or heating, and a vapor passage connecting the regenerator-heat releaser to the absorber-evaporator, the absorber-evaporator being provided with an aqueous solution recycle system comprising a sprayer for spraying the aqueous solution contained therein onto the heat transfer tube and an aqueous solution pump.

The water vapor pressure of an aqueous solution of a salt is lower than the water vapor pressure of pure water and thus the water vapor pressure is lowered at the same cooling temperature thereby and consequently the regeneration temperature can be lowered.

DESCRIPTION OF THE PREFERRED EMBODIMENTS

Before explaining the present invention with reference to embodiments of the present invention, an inventive concept of the present invention will be explained at first with reference to FIG. 1.

Figure 1:
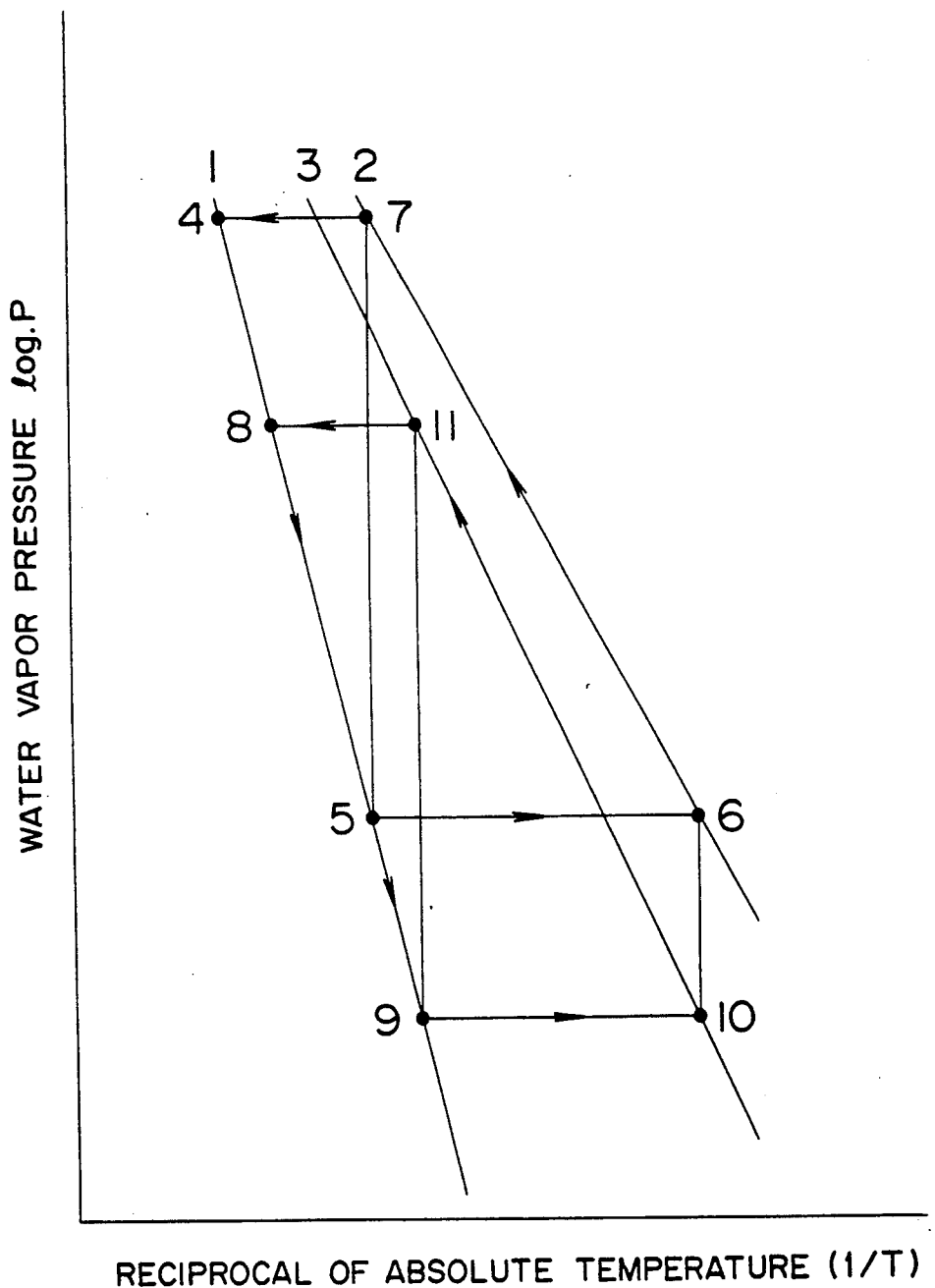
FIG. 1 is a state diagram showing the relationship between the temperature and pressure, that is, the principle of the present invention.

In FIG. 1, the state diagram showing the relationship between the temperature and the pressure, that is, the principle of the present invention, is given, where the axis of abscissa shows a reciprocal of absolute temperature, 1/T, and the axis of ordinate shows a logarithm of water vapor pressure, log P.

On the basis of Clapeyron-Clausius equation, a basic equation for chemical equilibrium, every compounds take a straight line on the diagram.

Straight line 1 show the following relationship:

$$CaO \rightleftharpoons Ca(OH)_2 \qquad (1)$$

Straight line 2 shows the following relationship:

$$H_2O(g) \rightleftharpoons H_2O(l) \qquad (2)$$

where (g) means a gas and (l) means a liquid.

The conventional heat pump cycle based on the foregoing relationship (1) and (2) is given by points 4→5→6→7. That is, at the highest temperature 4, the following reaction takes place to give the output temperature of the heat pump:

$$CaO + H_2O(g) \rightarrow Ca(OH)_2 \quad (3)$$

Point 5 shows the regeneration temperature and pressure, at which the following reaction takes place, where the pressure depends on the cooling to point 6.

$$Ca(OH)_2 \rightarrow CaO + H_2O(g) \quad (4)$$

That is, at point 6, the following state change takes place:

$$H_2O(g) \rightarrow H_2O(l) \quad (5)$$

On the other hand, point 7 shows water vapor generation (water evaporation) and at the same temperature as the regeneration temperature the following state change takes place:

$$H_2O(l) \rightarrow H_2O(g) \quad (6)$$

Then, the reaction of equation (3) takes place and heat is released at point 4 to complete the heat pump cycle.

In this manner, if there is heat corresponding to the points 5 and 7 and if the cooling is made to the temperature at point 6, heat can be released at point 4, that is, a heat pump with an output temperature 4 is available. The foregoing is the principle of the conventional heat pump.

In the present invention, a third substance is used to change the working pressure of the conventional system.

In FIG. 1, straight line 3 shows the equilibrium of an aqueous solution of a salt, for example, an aqueous solution of lithium bromide, where the heat pump cycle is given by points 8→9→10→11, and the temperature point 10 is made equal to the point 6 of the conventional cycle. Consequently, the regeneration temperature and the vapor generation temperature are at point 9 and at point 11, respectively, and the heat release temperature, i.e. the output temperature is at point 8. That is, a heat pump can be realized with the heat at a lower output temperature than that of the conventional heat pump.

This is because the water vapor pressure at the same cooling temperatures 10 and 6 is lowered from point 6 to point 10 when water is changed to an aqueous lithium bromide solution and consequently the regeneration temperature can be lowered from point 5 to point 9. Point 11 shows the water vapor pressure of aqueous lithium bromide solution at temperature 9. Thus, by use of a third substance the regeneration temperature as well as the output temperature can be changed.

In normal practical applications of heat pumps, cooling water, etc. are used for the cooling and thus it is hard to largely change the cooling temperature. Thus, in order to obtain a heat pump in accordance to the available regeneration temperature, it is effective to use a third substance that satisfies the desired water vapor pressure, and water vapor pressure characteristics can be properly selected in view of its composition and concentration. For example, relations between the concentration and the water vapor pressure of aqueous lithium bromide solution are as follows:

| | At 60° C., | | | |
|---|---|---|---|---|
| Concentration (kg/kg) | 0.4 | 0.6 | 0.65 | 0.7 |
| Water vapor pressure (Pa) | 11900 | 2145 | 1200 | 680 |
| | At 40° C., | | | |
| Concentration (kg/kg) | 0.4 | 0.6 | 0.65 | 0.7 |
| Water vapor pressure (Pa) | 4240 | 680 | 370 | 210 |

As the third substance, not only salts but also acids, alkalis and organic compounds can be used alone or in mixtures. That is, an aqueous solution of a plurality of these third substances can be used, if there are no interactions therebetween.

The third substance includes, for example, $AlCl_3$, $Al_2(SO_4)_3$, $BaBr$, $BaCl_2$, $Ba(ClO_3)_2$, $Ba(OH)_2$, $Ba(NO_3)_2$, $BaSO_4$, $CaBr_2$, $CaCl_2$, $Ca(NO_3)_2$, $CaS_2O_3$, $CdBr_2$, $CdCl_2$, $Cd(ClO_3)_2$, $CdI_2$, $Cd(N)_3)_2$, $CdSO_4$, $CoCl_2$, $Co(NO_3)_2$, $CoSO_4$, $CoCl_2$, $Co(NO_3)_2$, $CoSO_4$, $FeSO_4$, $H_3BO_3$, $H_3PO_4$, $KBrO_3$, $KCl$, $KClO_3$, $KClO_4$, $KHCO_3$, $KHSO_4$, $KH_2PO_4$, $KI$, $KNO_2$, $KNO_3$, $KOH$, $K_2CO_3$, $K_2C_2O_4$, $K_2WO_4$, $LiCl$, $LiHSO_4$, $LiI$, $LiNO_3$, $LiOH$, $Ll_2CrO_4$, $Ll_2SiF_6$, $MgBr_2$, $MgCl_2$, $MgH_2(SO_4)_2$, $Mg(NO_3)_2$, $MgSO_4$, $MnCl_2$, $MnSO_4$, $NH_4Br$, $NH_4Cl$, $NH_4I$, $NH_4NO_3$, $NH_4HSO_4$, $(NH_4)_2SO_4$, $(NH_4)_2SiF$, $NaBr$, $NaBrO_3$, $NaCl$, $NaClO_3$, $NaHCO_3$, $NaHSO_4$, $NaH_2PO_4$, $NaI$, $NaNO_2$, $NaNO_3$, $NaOH$, $Na_2CO_3$, $Na_2C_2O_4$, $Na_2HPO_4$, $Na_2SO_4$, $Na_2WO_4$, $Na_3PO_4$, $(NaPO_3)_3$, $NaP_2O_7$, $(NaPO_3)_6$, $NiCl_2$, $Ni(NO_3)_2$, $NiSO_4$, $Pb(NO_3)_2$, $SrBr_2$, $SrCl_2$, $Sr(NO_3)_2$, $ZnCl_2$, $Zn(NO_3)_2$, $ZnSO_4$, $LiSCN$, $CsBr$, $CsF$, $RbF$, $LiBr\text{-}LiSC$, $LiBr\text{-}LiCl$, $LiBr\text{-}ZnCl_2$, $LiBr\text{-}ZnBr_2$, $LiCl\text{-}CaCl_2\text{-}Zn(NO_3)_2$, $LiCl\text{-}CaCl_2\text{-}ZnCl_2$, $LiCl\text{-}LiBr\text{-}ZnCl_2$, $LiCl\text{-}MgCl_2\text{-}Zn(NO_3)_2$, $LiCl\text{-}LiI\text{-}Zn(NO_3)_2$, $H_2SO_4$, etc.

Now, embodiments of the present invention will be described in detail below, referring to FIGS. 2 to 5.

Figure 2:
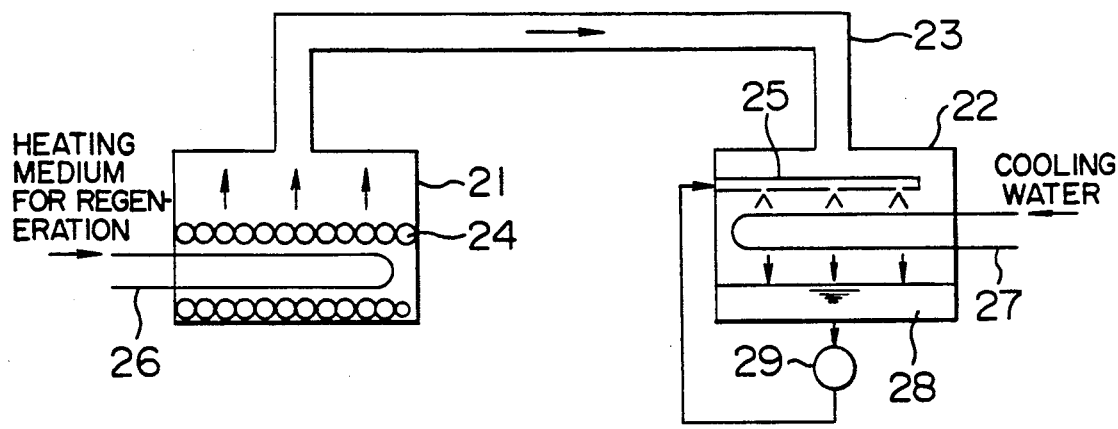
FIG. 2 is a schematic view showing the regeneration step of a chemical heat pump according to one embodiment of the present invention.
Figure 3:
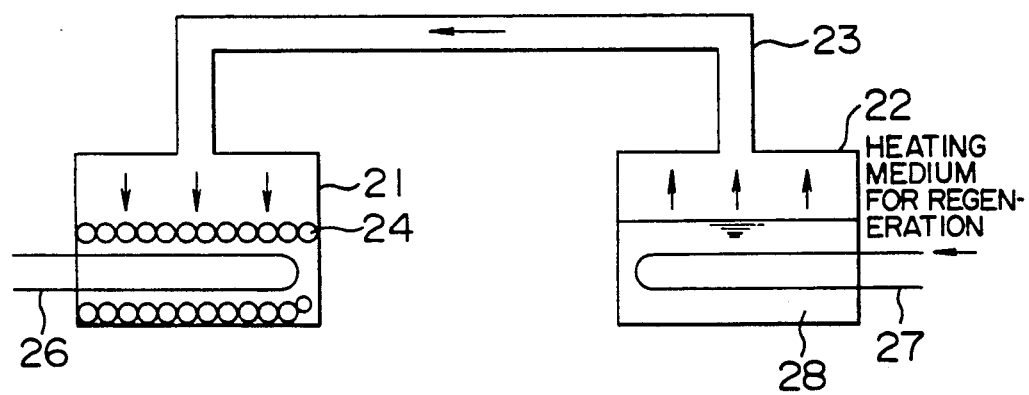
FIG. 3 is a schematic view showing the reaction-temperature elevation step of the chemical heat pump shown in FIG. 2.

FIG. 2 is a schematic view showing the regeneration step of a chemical heat pump according to one embodiment of the present invention and FIG. 3 is a schematic view of the reaction step of the chemical heat pump shown in FIG. 2.

The chemical heat pump shown in FIG. 2 comprises a regenerator-heat releaser 21, which corresponds to a reactor, a absorber-evaporator 22, which corresponds to an evaporator-condenser, and a duct 23 as a vapor passage, which connects the regenerator-heat releaser to the absorber-evaporator.

In the regenerator-heat releaser 21, calcium oxide (CaO) which works as a chemical heat-storing material 24, is filled and a heat transfer tube 26 is provided at the inside.

On the other hand, in the absorber-evaporator 22, an aqueous lithium bromide solution 28 is contained and a heat transfer pipe 27 for cooling or heating is provided at the inside. A sprayer 25 for spraying the aqueous lithium bromide solution 28 onto the heat transfer pipe 27 is also provided overhead of the heat transfer tube 27 at the inside, and an aqueous solution pump 29 is provided in an aqueous solution recycle line for supplying the aqueous lithium bromide solution 28 from the absorber-evaporator to the sprayer 25.

Explanation will be made of the regeneration step of FIG. 2.

Cooling water is passed through the heat transfer tube 27 of the absorber-evaporator 22 and the aqueous solution pump 29 is driven to spray the aqueous lithium bromide solution 28 onto the heat transfer tube 27 from the sprayer 25. The aqueous lithium bromide solution 28 is cooled and its water vapor pressure is lowered to vacuum.

Calcium oxide, which will be hereinafter referred to as CaO, as the chemical heat-storing material 24 in the regenerator-heat releaser 21, is in a state of calcium hydroxide, which will be referred to as $Ca(OH)_2$, as a result of reaction with water till that time. When a regenerating heating medium is passed through the heat transfer tube 26 in that state, water vapor generates from $Ca(OH)_2$ because the entire system is in a vacuum state. The generated water vapor moves through the duct in the direction of arrow and is absorbed into the aqueous lithium bromide solution 28 in the absorber-evaporator 22. The heat of absorption is removed by the cooling water passing through the heat transfer tube 27. In this manner, $Ca(OH)_2$ is regenerated to CaO and the generated water vapor is absorbed into the aqueous lithium bromide solution 28.

The regenerating heating medium for the heat transfer tube 26 is hot water, steam, etc., which can be also obtained, for example, by utilizing the midnight electric power, waste heat, etc.

Now, explanation will be made of the reaction and temperature elevation step of FIG. 3.

In FIG. 3, the aqueous solution recycle line at the absorber-evaporator 22 is not shown for the convenience of explanation.

A regenerating heating medium is passed through the heat transfer tube 27 of the absorber-evaporator 22 in FIG. 3, and the aqueous lithium bromide solution 28 boils and generates water vapor. The generated water vapor moves through the duct 23 in the direction of arrow and is adsorbed onto CaO as the chemical heat-storing material 24 in the regenerator-heat releaser 21 and CaO reacts with the water vapor. The chemically heat-storing material 24 is heated to a higher temperature with the generated heat of reaction and a high temperature medium in the heat transfer tube 26 is fed to a load end.

In this manner, CaO is changed to $Ca(OH)_2$ and the aqueous lithium bromide solution is concentrated. The concentration of aqueous lithium bromide solution can be selected from the temperature-pressure relationship shown in FIG. 1 in view of the heating medium temperature for regeneration and the cooling water temperature.

According to the aforementioned embodiment, the regeneration temperature can be lowered even if the same cooling temperature is used. Particularly by properly selecting the concentration of aqueous lithium bromide solution any desired regeneration temperature can be obtained for a given cooling temperature. Thus, a heat pump of $CaO/Ca(OH)_2$ system, which meets the temperature conditions of a cooling medium (cooling water) and a regenerating medium (regenerating heating medium) can be obtained and an application range of a heat pump can be effectively extended.

Figure 4:
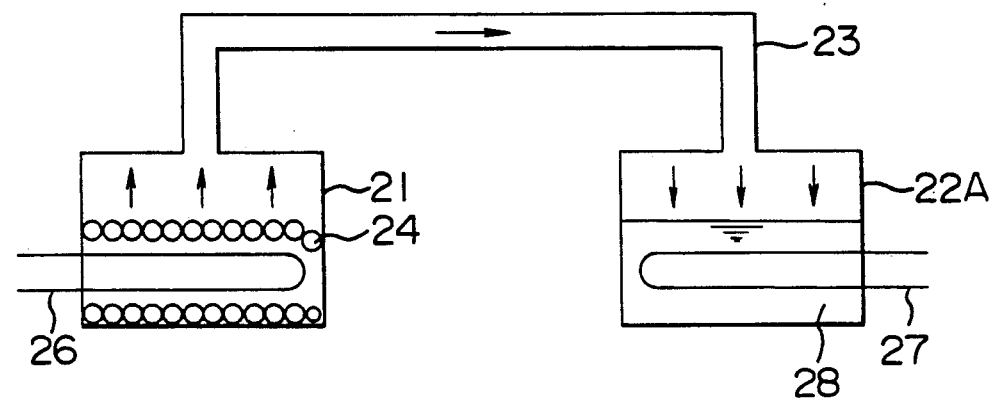
FIG. 4 is a schematic view showing the regeneration step of a chemical heat pump according to another embodiment of the present invention.
Figure 5:
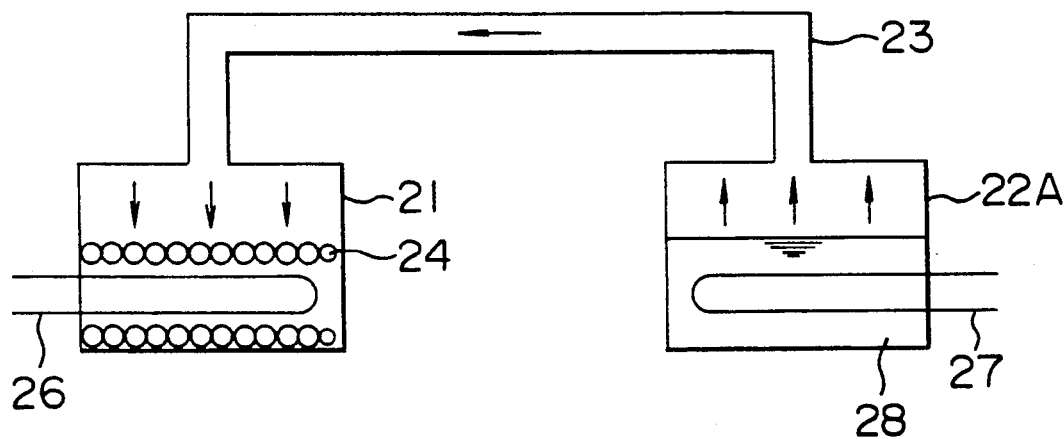
FIG. 5 is a schematic view showing the reaction-temperature elevation step of the chemical heat pump shown in FIG. 5.

FIG. 4 is a schematic view showing the regeneration step of a chemical heat pump according to another embodiment of the present invention, and FIG. 5 is a schematic view showing the reaction and temperature elevation step of the chemical heat pump of FIG. 4, where the same members as those of FIGS. 2 and 3 are identified with the same reference numerals as used in FIGS. 2 and 3, and thus explanation of such members is omitted from the following description.

The only difference of the embodiment of FIGS. 4 and 5 from that of FIGS. 2 and 3 is that no aqueous solution recycle system including the sprayer, the aqueous solution pump, etc. is provided at the absorber-evaporator 22A.

The aqueous lithium bromide solution 28 is contained in the absorber-evaporator 22A and the heat transfer tube 27 is provided as dipped in the aqueous solution 28.

In the regeneration step shown in FIG. 4, the aqueous lithium bromide solution 28 is cooled by passing cooling water through the heat transfer tube 27 and the water vapor pressure is lowered to vacuum. When the regenerating heating medium is passed through the heat transfer tube 26 in this state, water vapor generates from $Ca(OH)_2$, reaction product of CaO with water. The generated water vapor moves through the duct 23 in the direction of arrow and is absorbed in the aqueous lithium bromide solution 28. The heat of absorption is removed by the cooling water passing through the heat transfer tube 27.

In this manner, $Ca(OH)_2$ is regenerated to CaO and the generated water vapor is absorbed into the aqueous lithium bromide solution 28.

The function of the chemical heat pump in the reaction and temperature elevation step of FIG. 5 is quite identical with that of the embodiment of FIG. 3.

According to the embodiment of FIGS. 4 and 5, the same effect as in FIGS. 2 and 3 can be obtained.

In the foregoing embodiments explanation has been made of the aqueous lithium bromide solution as an aqueous solution of salt to be contained in the absorber-evaporator, but the present invention is not limited thereto. As the salt for the aqueous solution, salts, acids, alkalis, or organic compounds capable of giving a lower water vapor pressure than that of pure water, when brought into an aqueous solution, can be selected, and the concentration of the aqueous solution can be selected from the temperature-pressure relationship of FIG. 1 in view of the heating medium temperature for regeneration and the cooling water temperature.

Figure 6:
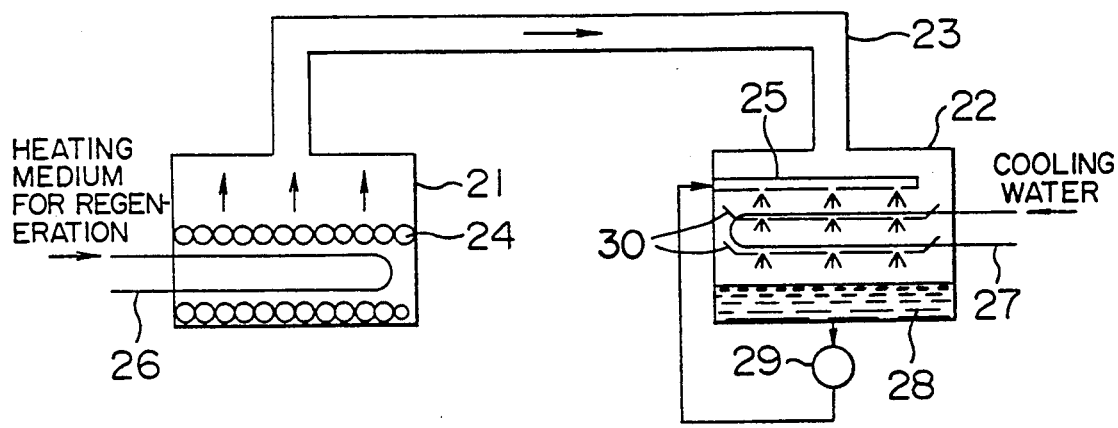
FIG. 6 is a schematic view showing the regeneration step of a chemical heat pump according to another embodiment of the present invention.

In the embodiment of FIG. 2, the sprayer 25 is provided overhead of the heat transfer tube 27. A plurality of trays 30 can be provided below the sprayer for the aqueous solution to increase the contact time of the sprayed aqueous solution, for example, aqueous lithium bromide solution, with the existing water vapor, thereby effectively increasing the absorption action, as shown in FIG. 6.

It is needless to say that it is also effective to tilt the plurality of trays at a suitable angle for the downward flow of the aqueous solution. A similar absorption action can be effectively obtained by providing a plurality of vertical plates below the sprayer for the aqueous solution, though particularly not illustrated, in place of the plurality of trays.

Furthermore, a similar absorption action can be effectively obtained also by providing a member filled with packing materials such as raschig rings, ball rings, berl saddles, Intalox saddles, tellerette packings, etc. below the sprayer for the aqueous solution.

What is claimed is:

1. A chemical heat pump, which comprises a regenerator-heat releaser filled with a chemically reactive heat-storing material provided with a heat transfer tube, through which a heating medium is passed, at the inside, wherein said chemically reactive heat-storing material is calcium oxide or calcium hydroxide; an absorber-evaporator containing an aqueous solution of a salt, an acid, an alkali or an organic compound and provided with a heat transfer tube for cooling or heating; a vapor passage communicating the regenerator-heat releaser with the absorber-evaporator; and an aqueous solution recycle system comprising a sprayer for spraying the aqueous solution onto the heat transfer tube in the absorber-evaporator, a plurality of trays provided below the sprayer of the aqueous solution and an aqueous solution pump being provided at the absorber-evaporator.

2. A chemical heat pump utilizing a reversible reaction between the reaction of calcium oxide with water to form calcium hydroxide and the reaction to dehydrate calcium hydroxide to calcium oxide and water, comprising:

a closed system consisting of a regenerator-heat releaser filled with calcium oxide or calcium hydroxide, an absorber-evaporator containing and aqueous solution of a salt, an acid, an alkali or ann organic compound, and a vapor passage communicating said regenerator-heat releaser with said absorber-evaporator;

a first heat transfer tube provided in said regenerator-heat releaser for heating said regenerator heat releaser to dehydrate said calcium hydroxide to generate calcium oxide and water vapor, and for carrying heat from said regenerator-heat releaser upon reaction of said calcium oxide and said water;

a second heat transfer tube provided in said absorber-evaporator for cooling and lowering the vapor pressure of said aqueous solution, and for heating said aqueous solution to generate water vapor 3. A chemical heat pump according to claim 2, wherein said aqueous solution is an aqueous solution of a salt 4. A chemical heat pump according to claim 2, wherein said aqueous solution comprises an aqueous lithium bromide solution.

* * * * *